United States Patent [19]

Morisset

[11] Patent Number: 5,111,610

[45] Date of Patent: May 12, 1992

[54] INSECT-KILLING DEVICE

[76] Inventor: Bernard G. Morisset, 5353 Dudemaine St., Montreal, Canada, H4J 1P2

[21] Appl. No.: 579,633

[22] Filed: Sep. 10, 1990

Related U.S. Application Data

[63] Continuation-in-part of Ser. No. 440,747, Nov. 24, 1989, abandoned.

[51] Int. Cl.⁵ .............................................. A01M 1/20
[52] U.S. Cl. ..................................... 43/132.1; 43/113
[58] Field of Search ............... 43/107, 113, 114, 132.1

[56] References Cited

FOREIGN PATENT DOCUMENTS 2202148  9/1987  Japan .................................. 43/132.1

Primary Examiner—Kurt Rowan
Attorney, Agent, or Firm—Pierre Lespérance

[57] ABSTRACT

An insect-killing device comprising a wall panel, edgewisely mounted to an overlying reflective hood which is spacedly mounted over ground by a ground post to support the panel over the ground. A layer of diatoma is bound on at least one face of the panel. The diatoma has sharp edges protruding outwardly therefrom. An ultra-violet radiation source mounted on one side of the reflective surface in register with the diatoma layer, lures insects to come in contact with the diatoma, which fatally injures the same.

12 Claims, 1 Drawing Sheet

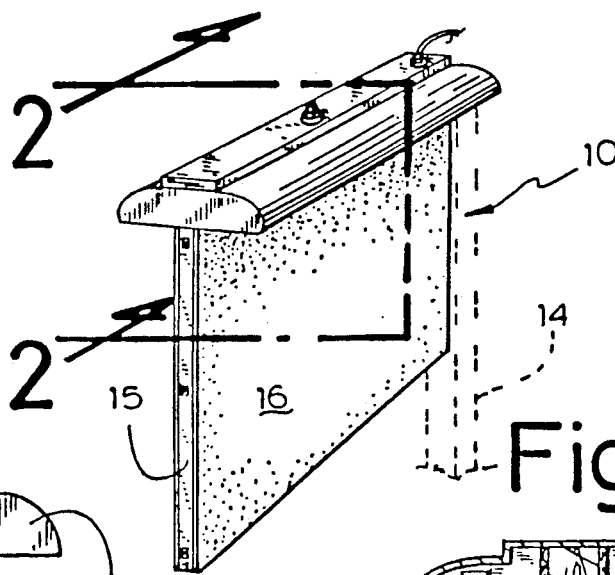

INSECT-KILLING DEVICE

CROSS REFERENCE DATA

This is a Continuation-in-Part application of co-pending utility patent application Ser. No. 07/440,747 filed Nov. 24, 1989, now abandoned.

FIELD OF THE INVENTION

This invention relates to the control of insect population, especially about human settlements.

BACKGROUND OF THE INVENTION

Among the world vegetal and animal kingdoms, there are about two million recorded different species, certainly more than ten million different species not already recorded by biologists, perhaps up to twenty or even thirty million different species.

The species of insects make up a large majority of the existing world species. That is to say their success in imposing them among the living creatures.

The role of insects in the spread of infectious diseases have been known for centuries, but effectively controlled only during the last century. For example, even now with all the progress made in the medical field, over a quarter of a billion humans are infected by the tropical disease malaria, and more than two million die each year of it. (Other dangerous tropical diseases include inter alia yellow fever, cholera and smallpox). Malaria is a disease provoked by a parasite called "plasmodium", which is carried by anopheles (flying insects) and which enter the bloodstream of humans when the anopheles sting the humans. These and other insects are thus the vector or carrier by which several diseases are transmitted to humans.

It is a well documented fact that parasite and other bacterial and viral-based diseases are one of the main causes of death of humans in the world, particularly for injured soldiers during wars.

Even when the insects are not carrying diseases, a large number of them constitute an annoyance, the more so when they have stinging capability. The venom used by mosquitoes, e.g., to coagulate the blood of stung animals and humans after the desired volume of blood has been sucked in, has localised itching properties which may last for days. It is also recognized that several tens of humans die each year from the venom of bee stings, especially since the so-called African Bee strain has invaded the wild in the Americas in 1956 following a major scientific error in their handling at a Brazilian entomological research compound.

It is thus paramount to control the spread of insects about human settlements. Among the known insect-controlling means, there exists electrical panels which electrocute incoming winged insects (such as mosquitoes) lured by an ultra-violet radiation source. Two of the problems associated with such a device are that they make a "zapping" noise each time an insect is electrocuted, an annoyance thus a sound pollution, and that it increases the electricity bill of the user.

Diatoma are granular materials, whose granulometry usually varies between about 0.005 to 0.015 inch. The insect-killing properties of diatoma are known by operators of shipping lines, where e.g. bulk grain cereals are mixed with diatoma to prevent insects from spreading thereinto. Indeed, diatoma, not being toxic to humans, can be readily eaten with the cereals. The sharp, microscopic edges of the diatoma are nevertheless highly lethal for insects who become sheared by these edges when coming in contact with the diatoma. On the other hand, since the diatoma usually cannot or will not be recuperated at the grain destination, relatively high costs are incurred because of the large quantity of lost diatoma.

It is also known to use diatoma mixed in a liquid solution to be vaporized on trees and other vegetal, in order to fight insect spreading thereon. However, a single rain will bring the diatoma down and into the ground, and thus will eliminate the advantageous features thereof on the trees.

In U.S. Pat. No. 3,141,444 to Kucera, there is provided a trap for flying insects, including a rigid panel surface coated with a sticky fly catching substance on its outer surface. The sticky surface is poisonous. It is because of the sticky and poisonous features of this substance that the insect trap is effective. Eventually however, the whole board will become clogged with insects glued to the sticky substance, and thus will have become inoperative, because there will remain no residual free space on the sticky surface to be engaged by an insect.

In U.S. Pat. No. 11,276 to Thum, granular material is combined into a sheet of sticky fly-paper. The granular material is provided to keep the sheets of fly-paper spaced apart, before their use, so as to retard the flow of the sticky material (by spreading or running over the margin and onto the back of the sheets), while the paper is kept in stock in folded or rolled condition. In this patent, there is envisioned that the sprinkling of the granular material over the surface of the paper could be made after the sticky substance has been applied thereon. However, only a very small fraction of the granular material will be allowed to protrude, see FIGS. 2-3 of this patent. It is clear from careful study of this patent that these protruding sections of the granular material are not designed to shear and kill wandering insects—the killer is the sticky material per se from the fly paper.

OBJECTS OF THE INVENTION

The main object of the invention is therefore to substantially reduce the number of insects, especially winged species of flies that sting humans, near houses, by providing a simple and very low cost device for killing these insects, which is both very effective while being noisefree.

Another object of the invention is to provide such an insect-killing device, which is self-cleaning, i.e. that the need for maintenance thereof is almost nil.

A general object of the invention is to enhance the quality of life of humans in insect-infected areas.

SUMMARY OF THE INVENTION

In accordance with the teachings of the invention, there is disclosed an insect-killing device comprising: (a) a flat, rigid support panel; (b) a glue compound, spread over said support panel and defining an inner layer, of adhesive nature adhesively fixedly secured to said support panel, and an outer layer, said outer layer defining a main free surface of non-adhesive nature; (c) a granular material, defining sharp outwardly protruding edges, said granular material sprinkled over at least a substantial portion of said free surface of the glue compound layer to become partially anchoringly embedded therein, wherein a substantial portion of said granular material protrudes outwardly from said glue compound free surface, so that said sharp edges thereof will shearingly injure insects wandering thereabout; and (d) luring means, to draw insects toward said glue compound main free surface.

Preferably, there is further included means to incline said support panel, said glue compound being waterproof, wherein the injured or killed insects will fall off from said support panel by their own weight, whereby said insect killing device is self-cleaning.

The thickness of the layer of latex glue could range between 0.002 and 0.003 inch. Advantageously, said granular material could be diatoma, of a size range preferably between 0.0005 to 0.0015 inch.

Profitably, the diatoma sinks into said glue compound outer layer by no more than 40% of its diameter.

Profitably, said support member is a wooden panel and said diatoma binding means is a waterproof glue of the latex glue class binding the diatoma to the wooden panel. It is envisioned in this case that said radiation source includes fluorescent-like tubes mounted into an arcuate (concave panelwise) hood and connected to an electrical power source, said hood being made from a material which is highly reflective to ultra-violet radiations, said support member being a rigid panel, said panel being edgewisely secured by one edge to said hood by said support means, wherein said tubes directly illuminate said diatoma surface. Preferably, a second panel would then be edgewisely mounted to said hood proximate the edgewise hood mount of the first-mentioned panel, to constitute an angle between the two panels; wherein diatoma are laid on the exterior faces of said panels; and wherein said positioning means includes ground-driven pegs extending through the edgewise sections of said panels opposite their hood mount edgewise section, said hood being thereby supported in horizontal position spacedly from the ground by this sloped, roof-like panel assembly ground-engaging post, and two retaining strips each depending from said hood and edgewisely anchored to the remaining edges of corresponding ones of said panels not secured to said hood, whereby at least one ultra-violet tube faces directly each diatoma-bound panel faces.

Also preferably, the diatoma would be laid on both faces of said panel; and wherein said positioning means includes a ground-engaging post, said hood being endwisely supported in horizontal position spacedly from the ground by said ground-engaging post, and a retaining strip depending from said hood and edgewisely anchored to the remaining edges of said panel not secured to said hood, whereby at least one ultra-violet tube faces directly each diatoma-bound panel face.

BRIEF DESCRIPTION OF THE DRAWINGS

FIG. 1 is a perspective view of one embodiment of the insect killing device;

FIG. 2 is a cross-sectional view thereof taken along line 2—2 of FIG. 1;

FIG. 3 is an edgewise view thereof; and

FIG. 4 is a perspective view of a second embodiment of insect killing device.

DETAILED DESCRIPTION OF THE INVENTION

In the first embodiment of the invention, device 10 consists in a rigid panel 12 e.g. made from wood, layers of diatoma being glued on both faces of panel 12 at 16 and 18, and an ultra-violet source 20 edgewisely mounted to the top of panel 12. U-V source 20 may include an elongated metallic hook 22, having a reflective surface and to which is mounted two opposite U-V tubes, e.g. of the Blacklite type. The U-V tubes are connected to an electrical power source, not shown. The glue on panel 12 may be latex glue, or other suitable waterproof glue.

The thickness of the layer of latex glue will preferably range between 0.002 and 0.003 inch, wherein the size range of the diatoma should preferably range between 0.0005 to 0.00015 inch. The latex glue should first be spread on the board 12, which will then be preferably horizontal during this operation. Following this, the diatoma is sprinkled or dusted over the horizontal latex covered board, so that a fraction only of the diatoma will sink into the latex. Preferably, the nature of the glue will be such that the diatoma will sink into the glue by no more than 40% of their diameter (even thought the latex layer is thicker than the diameter of the diatoma). Hence, the latex main layer will define an inner layer section, for fixedly securing to the board 12, and an outer layer section, for binding the diatoma to the board. The chosen glue should be waterproof, of sufficient viscosity or density to afford the above-noted load-bearing features, should not be able to solubilize the diatoma, and should be non sticky on its outer free surface after the glue has cured and set on the board.

It is thus understood that at least 60% of the diatoma will protrude outwardly from the latex layer, wherein the diatoma sharp edges destined to shear—and injure or kill—the wandering insects, will positively protrude outwardly from the latex thickness. This is essential, since should the latex covering surround the whole of the diatoma, its sharp edges would be concealed and thus, its insect killing properties would become inoperative. Preferably, the diatoma will cover substantially the whole outer section of the latex layer on the board.

The top edge of panel 12 is retained in place to the center of hood 22, between the two light tubes 24, by having the other edges of panel 12 reinforced by a metallic strip 15 bolted in place at B, this metallic strip depending from hood 22. The hood 22 is endwisely supported in horizontal position over ground by an upright post 14, wherein panel 12 is maintained in vertical position spaced from ground. The hood 22 is arcuate, being concave panelwise i.e. concave with respect to the ground.

The insects, both winged and wingless, are lured by the U-V emission produced by tubes 24, and, being excited by this radiation and thus following an erratic flight path or wall travel, eventually come in contact with the diatoma 16 or 18 on panel 12. There, their fragile body and/or winds is (are) scratched by the diatoma. The injured insects die quickly. By increasing the surface of diatoma layers 16, 18 on panel 12, being lighted by the U-V source 20, the efficiency of the insect luring and killing properties of the device 10 will increase. The diatoma granulometry is directly related to a specified type of insect, wherein larger insects substantially exclusively of smaller ones will be injured by panel-bound large granule diatoma, and vice-versa.

In the second embodiment of FIG. 4, device 26 includes two wooden panels 12', 12A" edgewisely anchored to the ground by ground-driven pegs 28 and maintained in a sloped, roof-like configuration by hood 22. Diatoma layers 30, 32 are laid on the exterior faces of the panels 12' 12" exclusively of the interior faces thereof. Indeed, the U-V tubes 24 thereof are positioned to face the upper section of these panels exterior faces, while the panels interior faces remain in the shadow. Side strips 15', 15" depending from hood 22 anchor the panels 12', 12" thereto.

It will be understood that, in either embodiment of insect-killing device, the diatoma-bound panels will be self-cleaning i.e. that the injured insects will fall by their own weight to the ground or fly away to die in a short while, since these diatoma bound panel faces are both inclined or vertical and spaced from the ground.

Also, it should be understood that the support member on which the diatoma are glued, need not be a rigid panel, nor does it need to be vertical. It is envisioned that the diatoma-bound support surface member could be, inter alia:

(a) the wall of a large hangar or airport terminal;

(b) a rugged yet flexible textile material for clothing;

(c) and generally speaking, any flat or irregularly shaped surface wall capable of supporting diatoma when bound thereto by binding means such as a suitable glue compound.

It is to be understood that when we refer to "diatoma", it is to consist of diatomaceous earth forming, when dry, a fine powder used as an abrasive, as a potery glaze, etc. Another name for diatoma is "diatomite".

I claim:

1. An insect-killing device comprising:
(a) a rigid support panel;
(b) a glue compound, spread over said support panel and defining an inner layer, of adhesive nature and adhesively anchored to said support panel, and an outer layer, said outer layer defining a main free surface of non-sticky nature;
(c) a granular material consisting of a plurality of granular particles each defining sharp outwardly protruding edges, said granular particles sprinkled over and partially embedded into at least a substantial portion of said outer layer of the glue compound said adhesive inner layer then being cured to said outer layer, wherein a substantial portion of said granular particles protrudes outwardly from said glue compound free surface, so that said sharp edges thereof will shearingly injure insects wandering thereabout; and
(d) luring means, to draw insects toward said glue compound main free surface.

2. An insect killing device as defined in claim 1, further including means to incline said support panel, said glue compound being waterproof, wherein the injured or killed insects will fall off from said support panel by their own weight, whereby said insect killing device is self-cleaning.

3. An insect killing device as defined in claim 2, wherein said granular material is diatoma.

4. An insect killing device as defined in claim 3, wherein the thickness of the layer of latex glue ranges between 0.002 and 0.003 inch.

5. An insect killing device as defined in claim 4, wherein the size range of the diameter of the diatoma is between 0.0005 to 0.0015 inch.

6. An insect killing device as defined in claim 5, wherein the diatoma sinks into said glue compound outer layer by no more than 40% of its diameter.

7. An insect-killing device as defined in claim 2, wherein said luring means includes fluorescent-like tubes mounted into an arcuate (concave panelwise) hood and connected to an electrical power source, said hood being made from a material which is highly reflective to ultra-violet radiations, said support panel being edgewisely secured by one edge to said hood by support means, wherein said tubes directly face said glue compound main free surface.

8. An insect-killing device as defined in claim 7, further including a second support panel, edgewisely mounted to said hood proximate the edgewise hood mount of the first-mentioned panel, to constitute an angle between the two panels; wherein the granular material is laid on the exterior faces of said panels; and wherein said positioning means includes ground-driven pegs extending through the edgewise sections of said panels opposite their hood mount edgewise section, said hood being thereby supported in horizontal position spacedly from the ground by their sloped, roof-like panel assembly ground-engaging post, and two retaining strips each depending from said hood and edgewisely anchored to the remaining edges of corresponding ones of said panels not secured to said hood, whereby at least one ultra-violet tube faces directly each granular material-bound panel faces.

9. An insect-killing device as defined in claim 8, wherein the granular material is laid on both faces of said panel; and wherein said positioning means includes a ground-engaging post, said hood being endwisely supported in horizontal position spacedly from the ground by said ground-engaging post, and a retaining strip depending from said hood and edgewisely anchored to the remaining edges of said panel not secured to said hood, whereby at least one ultra-violet tube faces directly each granular material-bound panel face.

10. An insect killing device as defined in claim 7, wherein said granular material is diatoma of a size range 0.0005 to 0.0015 inch.

11. An insect killing device as defined in claim 8, wherein said granular material is diatoma of a size range 0.0005 to 0.0015 inch.

12. An insect killing device as defined in claim 9, wherein said granular material is diatoma of a size range 0.0005 to 0.0015 inch.

* * * * *